United States Patent
Nordback

(10) Patent No.: US 10,675,857 B2
(45) Date of Patent: Jun. 9, 2020

(54) PATTERNS FOR 3D PRINTING

(71) Applicant: Konica Minolta Business Solutions U.S.A., Inc., San Mateo, CA (US)

(72) Inventor: Kurt Nathan Nordback, Chapel Hill, CO (US)

(73) Assignee: Konica Minolta Business Solutions U.S.A., Inc., San Mateo, CA (US)

(*) Notice: Subject to any disclaimer, the term of this patent is extended or adjusted under 35 U.S.C. 154(b) by 532 days.

(21) Appl. No.: 15/395,435

(22) Filed: Dec. 30, 2016

(65) Prior Publication Data
US 2018/0186092 A1    Jul. 5, 2018

(51) Int. Cl.
*B33Y 50/02* (2015.01)
*B29C 64/386* (2017.01)

(52) U.S. Cl.
CPC ............ *B33Y 50/02* (2014.12); *B29C 64/386* (2017.08)

(58) Field of Classification Search
CPC ......... B33Y 50/02; B33Y 30/00; B33Y 10/00; B29C 64/386
USPC ........................................................ 700/118
See application file for complete search history.

(56) References Cited

U.S. PATENT DOCUMENTS

| | | | |
|---|---|---|---|
| 2014/0039659 A1* | 2/2014 | Boyer | B33Y 10/00 700/98 |
| 2015/0079327 A1 | 3/2015 | Kautz et al. | |
| 2015/0212343 A1* | 7/2015 | Fonte | G06F 16/22 351/159.74 |
| 2015/0235069 A1* | 8/2015 | Kumar | G06K 7/1426 235/462.09 |
| 2015/0331402 A1 | 11/2015 | Lin et al. | |
| 2016/0067927 A1* | 3/2016 | Voris | B33Y 50/02 700/98 |
| 2016/0212201 A1* | 7/2016 | Munemann | H04L 67/306 |
| 2016/0221266 A1* | 8/2016 | Cronin | G05B 19/4099 |
| 2016/0236416 A1* | 8/2016 | Bheda | B29C 64/386 |

FOREIGN PATENT DOCUMENTS

| | | |
|---|---|---|
| EP | 3051445 A1 | 8/2016 |
| WO | 2015-051332 A1 | 4/2015 |
| WO | 2015-106836 A1 | 7/2015 |
| WO | 2016-119879 A1 | 8/2016 |
| WO | 2016-143314 A1 | 9/2016 |

OTHER PUBLICATIONS

Extended European Search Report issued in corresponding European Patent Application No. 17202050.5 dated May 25, 2018 (8 pages).
Office Action issued in corresponding European Patent Application No. 17202050.5 dated Apr. 23, 2020 (6 pages).

* cited by examiner

*Primary Examiner* — Ziaul Karim

(74) *Attorney, Agent, or Firm* — Osha Liang LLP

(57) ABSTRACT

A method for three-dimensional (3D) printing. The method includes: obtaining a native file of a computer-aided design (CAD) application; identifying, within the native file, a first 3D shape associated with a 3D infill pattern; generating a slicer description language file including: a first section specifying the 3D infill pattern; and a second section including instructions to print the first 3D shape filled with multiple instances of the 3D infill pattern by referencing the first section, where the first section and the second section are separate in the slicer description language file; and sending the slicer description language file to a 3D printer for printing the first 3D shape filled with the 3D infill pattern.

17 Claims, 5 Drawing Sheets

PATTERNS FOR 3D PRINTING

BACKGROUND

Additive manufacturing (AM) is a manufacturing process that incrementally accretes material onto an object. AM technologies include those that involve extruding a material from a small nozzle; fusing or solidifying a material in a tank of power or liquid; or stacking and gluing cut layers (e.g., cut layers of paper), etc. A slicer is software that converts a 3D description of an object into commands that control a 3D printer (e.g., AM device). In contrast, conventional milling is considered "subtractive" in that it involves removal of material to form the desired shape. The same is also true for bulk-forming techniques, such as casting, forging, and injection molding, which are not accretive but form an entire shape at once.

Users often wish to print three-dimensional (3D) shapes having 3D infill patterns, which are patterns that fill the inside of the 3D shape (e.g., checkerboard of cubes, honeycomb, etc.). Further, users often wish to print 3D shapes having texture patterns, which are raised patterns (e.g., small nubbins) applied to an external surface of the 3D shape (e.g., to improve the grip, to change the fluid flow across the surface, etc.). Additionally or alternatively, users often want the 3D infill patterns and/or texture patterns to have specific bulk properties (e.g., density, tensile strength, etc.)

However, specifying 3D infill patterns and texture patterns in a computer aided design (CAD) can be difficult because the user must specify every detail instead of specifying a high-level intent. Further, because every detail has been specified, the resulting files that are sent to the slicer for printing tend to be very large. Further, generation of these files is slicer specific, and thus re-generation must take place for different slicers. Further still, the user must also take into account the print parameters of 3D infill patterns (even well-known 3D infill patterns), the printing material, and the hardware (i.e., mechanical components) of the 3D printer in order to print a 3D shape with specific bulk properties. Regardless, users are still interested in printing 3D shapes with 3D infill patterns and/or texture patterns.

SUMMARY

In general, in one aspect, the invention relates to a method for three-dimensional (3D) printing. The method comprises: obtaining a native file of a computer-aided design (CAD) application; identifying, within the native file, a first 3D shape associated with a 3D infill pattern; generating a slicer description language file comprising: a first section specifying the 3D infill pattern; and a second section comprising instructions to print the first 3D shape filled with multiple instances of the 3D infill pattern by referencing the first section, wherein the first section and the second section are separate in the slicer description language file; and sending the slicer description language file to a 3D printer for printing the first 3D shape filled with the 3D infill pattern.

In general, in one aspect, the invention relates to a non-transitory computer readable medium (CRM) storing computer readable program code. The computer readable program code, when executed by a computer processor: obtains a native file of a computer-aided design (CAD) application; identifies, within the native file, a first 3D shape associated with a 3D infill pattern; generates a slicer description language file comprising: a first section specifying the 3D infill pattern; and a second section comprising instructions to print the first 3D shape filled with multiple instances of the 3D infill pattern by referencing the first section, wherein the first section and the second section are separate in the slicer description language file; and sends the slicer description language file to a 3D printer for printing the first 3D shape filled with the 3D infill pattern.

In general, in one aspect, the invention relates to a system for three-dimensional (3D) printing. The system comprises: a memory; a computer processor that: obtains a native file of a computer-aided design (CAD) application; identifies, within the native file, a first 3D shape associated with a 3D infill pattern; generates a slicer description language file comprising: a first section specifying the 3D infill pattern; and a second section comprising instructions to print the first 3D shape filled with multiple instances of the 3D infill pattern by referencing the first section, wherein the first section and the second section are separate in the slicer description language file; and sends the slicer description language file; and a 3D printer that: receives the slicer description language file; and prints, based on the slicer description language file, the first 3D shape filled with the 3D infill pattern.

Other aspects of the invention will be apparent from the following description and the appended claims.

DETAILED DESCRIPTION

Figure 1:
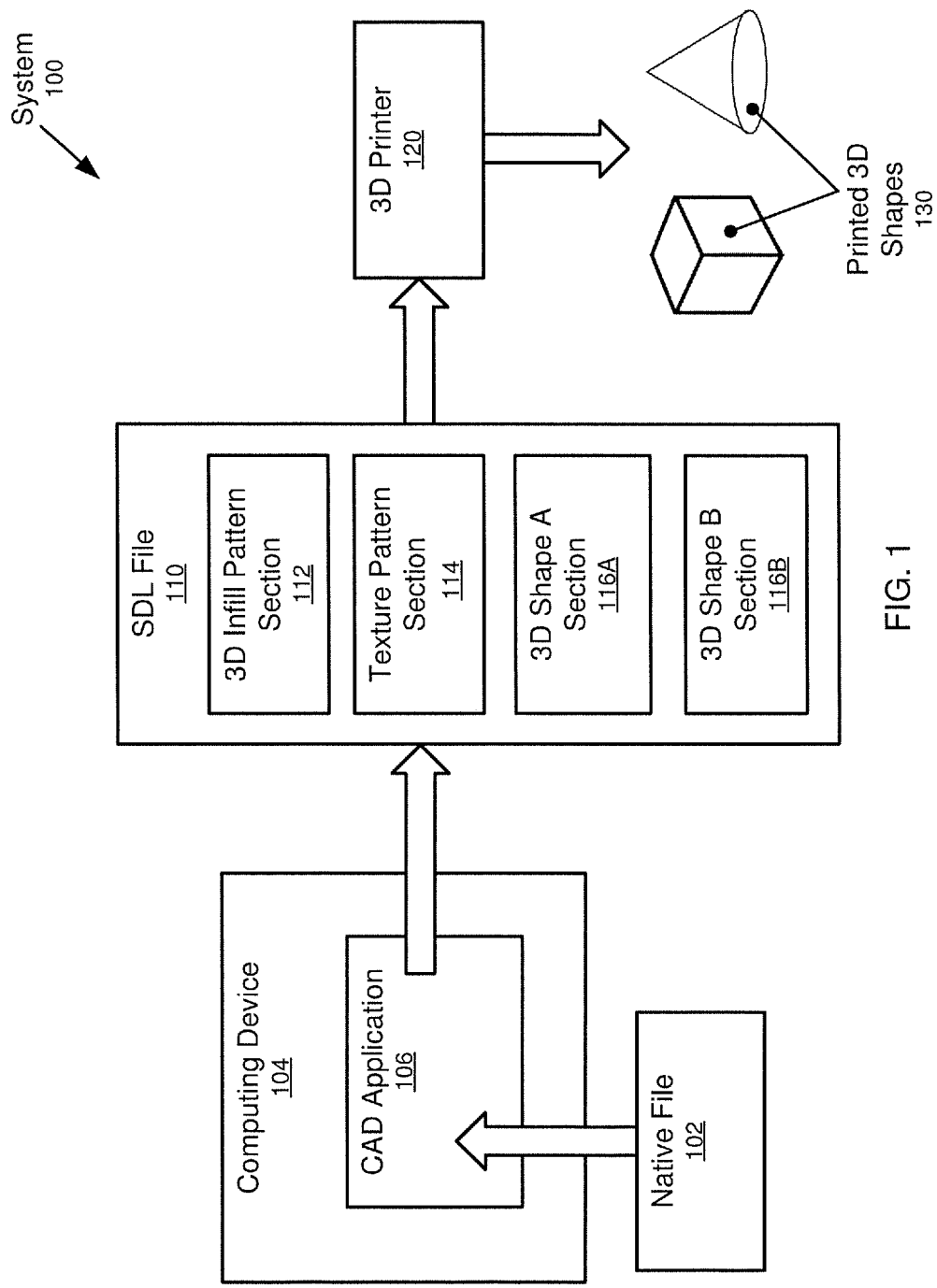
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium (CRM) for 3D printing. Specifically, a 3D shape with a 3D infill pattern and/or a texture pattern is identified within a native file of a computer-aided design (CAD) application. A slicer description language (SDL) file is generated based on the native file. The SDL file has multiple sections (e.g., blocks of code) including: a section specifying the 3D infill pattern; a section specifying the texture pattern; and a section including instructions to print the 3D shape according to the 3D infill pattern and the texture pattern by referencing the other sections. In one or more embodiments of the invention, the SDL file may also include one or more user-desired bulk properties of the 3D infill pattern and/or the texture pattern. The slicer receives the SDL file and then determines various print parameters of the 3D infill pattern and/or the texture pattern based on the printing material (e.g., rubber, plastic, etc.) and the 3D printer hardware (i.e., mechanical components). The 3D shape can then be printed in accordance with the user's high-level intent/goals (e.g., desired bulk properties).

FIG. 1 shows a system (100) in accordance with one or more embodiments of the invention. As shown in FIG. 1, the system (100) includes a computing device (104) executing a CAD application (106). The computing device (104) may be a personal computer (PC), a server, a laptop, a mobile computing device (e.g., smart phone, tablet PC, etc.), a kiosk, etc. The system (100) also includes a 3D printer (120). The computing device (104) and the 3D printer (120) may be part of the same unit. Alternatively, the computing device (104) and the 3D printer (120) may be connected by a computer network of any size having wired and/or wireless segments.

In one or more embodiments of the invention, the CAD application (106) enables a user to create (i.e., design, model, etc.) one or more 3D shapes. A 3D shape may be created using libraries of simpler/basic 3D shapes. A created 3D shape may be stored in a native file (102) of the CAD application (106). The native file (102) may be retrieved at a future time to edit or view the created 3D shape. The native file (102) may store surface description(s) or volumetric description(s) of the created 3D shape.

In one or more embodiments of the invention, the CAD application (106) enables a user to select a 3D infill pattern (e.g., honeycomb, cubed checkerboard, known lattice pattern, etc.) to "fill" a created 3D shape. The 3D infill pattern may need to be repeated multiple times (i.e., multiple instances of the 3D infill pattern) to completely "fill" the 3D shape (i.e., the volume of the 3D infill pattern may be much smaller than the volume of the 3D shape). The CAD application (106) also enables a user to remove the 3D infill pattern applied to a 3D shape or replace the existing 3D infill pattern applied to the 3D shape with a different 3D infill pattern. The CAD application (106) may include a library of existing 3D infill patterns from which the user can choose a 3D infill pattern to apply to the created 3D shape.

Those skilled in the art, having the benefit of this detailed description, will appreciate that if the 3D shape is printed, the 3D infill pattern "filling" the 3D shape might or might not be visible to the user. However, the 3D infill pattern "filling" the 3D shape affects the structural properties of the printed 3D shape. Moreover, the 3D infill pattern has one or more bulk properties (e.g., density, tensile strength, etc.) that are highly dependent on the printing material. In one or more embodiments of the invention, the CAD application (106) enables a user to specify one or more desired bulk properties of the 3D infill pattern applied to a 3D shape. The selected 3D infill pattern and its user-desired bulk properties may be stored in the native file (102).

In one or more embodiments of the invention, the CAD application (106) enables a user to select a texture pattern (e.g., raised patterns such as small nubbins) for application to a surface (e.g., external surface) of the created 3D shape. Different surfaces of the 3D shape may have different texture patterns. The CAD application (106) also enables a user to remove the texture pattern applied to a surface of a 3D shape or replace the existing texture pattern applied to the surface of the 3D shape with a different texture pattern. The CAD application (106) may include a library of existing texture patterns from which the user can choose a texture pattern for application to the surface of a created 3D shape.

Those skilled in the art, having the benefit of this detailed description, will appreciate that if the 3D shape is printed, the texture pattern might be visible/perceivable to the user. The texture pattern may have one or more bulk properties that are highly dependent on the printing material. For example, the texture pattern may affect fluid flow across the surface of the 3D shape. As another example, the texture pattern may affect the grip (or the user's ability to grip) the 3D shape. In one or more embodiments of the invention, the CAD application (106) enables a user to specify one or more desired bulk properties of the texture pattern. The selected texture pattern and its user-desired bulk properties may be stored in the native file (102).

In one or more embodiments, the computing device (104) and the 3D printer (120) communicate by way of a slicer description language (SDL) file (110). The SDL file (110) is generated by the CAD application (106) based on the native file (102). Additionally or alternatively, the SDL file (110) may be generated by another software application (not shown) from the native file (102).

As shown in FIG. 1, the SDL file (110) has multiple sections (e.g., blocks of code) including: a 3D infill pattern section (112), a texture pattern section (114), and multiple 3D shape sections (i.e., 3D Shape A section (116A), 3D Shape B section (116B)). The SDL file is effectively a description of what should be printed by the 3D printer (120). Although the SDL file (110) of FIG. 1 has only one 3D infill pattern section (112) and only one texture pattern section (114), in other embodiments, there may be multiple 3D infill pattern sections and/or multiple texture pattern sections.

In one or more embodiments, the 3D infill pattern section (112) specifies a 3D infill pattern. The 3D infill pattern may be specified by its name (e.g., honeycomb) or a unique identifier known to the slicer of the 3D printer (120). Additionally or alternatively, the 3D infill pattern may be specified by one or more instructions to create a geometric unit of the 3D infill pattern. During printing, the geometric unit would be printed repeatedly to fill a 3D shape. However, the 3D infill pattern section (112) only has a single instance of the geometric unit of the 3D infill pattern. The 3D infill pattern section (112) may also specify one or more user-desired bulk properties of the specified 3D infill pattern. Additionally or alternatively, the one or more user-desired bulk properties may be specified in a different section (e.g., 3D shape section (116A, 116B)).

In one or more embodiments, the texture pattern section (114) specifies a texture pattern. The texture pattern may be specified by its name or a unique identifier known to the slicer of the 3D printer (120). Additionally or alternatively, the texture pattern may be specified by one or more instructions to create a geometric unit of the texture pattern. During printing, the geometric unit would be printed repeatedly to cover the surface of a 3D shape. However, the texture pattern section (114) only has a single instance of the geometric unit of the texture pattern. The texture pattern section (114) may also specify one or more user-desired bulk properties of the texture pattern. Additionally or alternatively, the one or more user-desired bulk properties may be specified in a different section (e.g., 3D shape section (116A, 116B)).

In one or more embodiments of the invention, each 3D shape section (116A, 116B) includes instructions to print a 3D shape. These instructions may include a reference to the 3D infill pattern section (122) if the 3D shape should be filled with the 3D infill pattern. These instructions might also specify one or more user-desired bulk properties for the 3D infill pattern that will fill the 3D shape. Additionally or alternatively, these instructions may include a reference to the texture pattern section (114) if the texture pattern should be applied to a surface of the 3D shape. These instructions might also specify one or more user-desired bulk properties for the texture pattern to be applied to the 3D shape.

Those skilled in the art, having the benefit of this detailed description, will appreciate that within the SDL file (110), a 3D shape and a 3D infill pattern are specified separately/independently. If there are multiple 3D shapes to be printed with the same 3D infill pattern, each 3D shape section (116A, 116B) may include a reference to the one 3D infill pattern section (112). Similarly, if the specified texture pattern is to be applied to multiple 3D shapes, each 3D shape section (116A, 116B) may include a reference to the one texture pattern section (114). By specifying the 3D infill pattern and the texture pattern separately from the 3D shapes to be printed, the size of the SDL file (110) may be reduced. Further, by specifying only a single geometric unit of the 3D infill pattern and/or texture pattern, the size of the SDL file (110) may also be reduced.

In one or more embodiments of the invention, the 3D printer (120) prints 3D shapes (e.g., printed 3D shapes (130)). Although not shown in FIG. 1, the 3D printer (120) may include a slicer that interprets the SDL file (110) and generates commands that control the 3D printer (120). In other words, the slicer interprets the SDL file (110) into basic commands for the 3D printer's printing technology and mechanical components (e.g., nozzles). The 3D printer (120) prints the 3D shapes with the appropriate 3D infill patterns and/or texture patterns. As discussed above, this may include repeatedly printing the single geometric unit specified in the 3D infill pattern.

In one or more embodiments, as also discussed above, the SDL file (110) may specify a bulk property for a 3D infill pattern or a texture pattern. The slicer (120) determines one or print parameters of the 3D infill pattern or texture pattern in order to meet the user-desired bulk property. This determination may be based on the printing material (e.g., rubber, plastic, etc.) being used as well as the printing technology and mechanical components being utilized by the 3D printer (120). In other words, the SDL file (110) conveys the user's high-level intentions/goals, while leaving specific implementation details to the slicer (120).

For example, in the case of a 3D infill pattern, the slicer may include a function f such that for a given printing material m, the lattice pattern l specified in the SDL file (110), and a user-desired tensile strength s also specified in the SDL file (110), a lattice thickness (i.e., a print parameter) t=f(m, l, s) achieves the desired strength. As another example, in the case of a texture pattern, the slicer (120) may include a function n such that for printing material m, the texture pattern r specified in the SDL file (110), and a user-desired grip value g also specified in the SDL file (110), a surface pattern-scale (i.e., a print parameter) t=n(m, r, g) achieves the desired grip value.

Although FIG. 1 only shows the one 3D printer (120), in other embodiments, there may be multiple 3D printers, and the slicer of each 3D printer is capable of interpreting the SDL file (110). Accordingly, there is no need to regenerate the SDL file (110) and there is no need to generate slicer specific SDL files. This reduces the likelihood of errors in the SDL file generation process.

Figure 2:
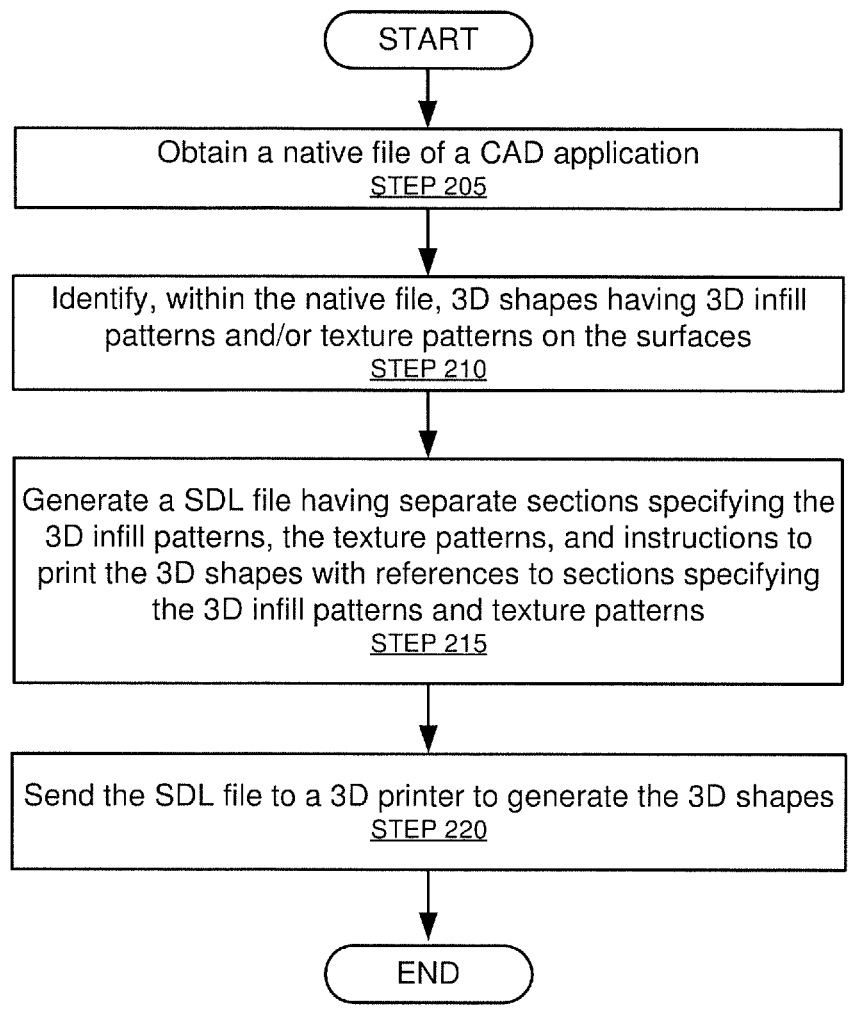
FIG. 2 and FIG. 3 show flowcharts in accordance with one or more embodiments of the invention.

FIG. 2 shows a flowchart in accordance with one or more embodiments of the invention. The flowchart depicts a process for 3D printing. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a native file of a CAD application is obtained (STEP 205). The native file may be downloaded from a website. The CAD application enables a user to create 3D shapes and specify 3D infill patterns and/or texture patterns for the 3D shapes. Accordingly, the native file may include surface descriptions and/or volumetric descriptions of one or more 3D shapes created by a user with the CAD application. The native file may also specify the 3D infill patterns and/or texture patterns. In STEP 210, 3D shapes having 3D infill patterns and/or texture patterns on the surfaces are identified from (e.g., by parsing) the native file.

In STEP 215, an SDL file is generated from the native file. The SDL file may include multiple separate sections (e.g., blocks of code): one section for each 3D infill pattern; one section for each texture pattern; and one section for each 3D shape.

A section for a 3D infill pattern may specify the 3D infill pattern by name or by a unique identifier. Additionally or alternatively, the section may include instructions/commands for generating a single geometric unit of the 3D infill pattern. The geometric unit would need to be repeatedly printed to fill a 3D shape (i.e., multiple instances of the 3D infill pattern may be needed to fill the 3D shape). As multiple 3D shapes may be filled with the same 3D infill pattern, there may be multiple references to the same 3D infill pattern section.

Similarly, a section for a texture pattern may specify the texture pattern by name or by a unique identifier. Additionally or alternatively, the section may include instructions/commands for generating a single geometric unit of the texture pattern. The geometric unit would need to be repeatedly printed to cover the surface of a 3D shape. As multiple 3D shapes may be covered by the same texture pattern, there may be multiple references to the same texture pattern section.

A section for a 3D shape includes instructions for generating the 3D shape. If the 3D shape is to be filled with a 3D infill pattern, the instructions include a reference to the section for the 3D infill pattern. Similarly, if a surface of the 3D shape is to be covered with a texture pattern, the instructions include a reference to the section for the texture pattern.

In STEP 220, the SDL file is sent to the slicer of a 3D printer. The slicer generates the 3D shapes according to the SDL file. In order to print the 3D shapes specified in the SDL file, the slicer must interpret the SDL file into basic commands for the 3D printer's printing technology and mechanical components (e.g., nozzles). The 3D printer prints the 3D shapes with the appropriate 3D infill patterns and/or texture patterns. As discussed above, this may include repeatedly printing the single geometric unit specified in the 3D infill pattern section and/or texture pattern section.

Figure 3:
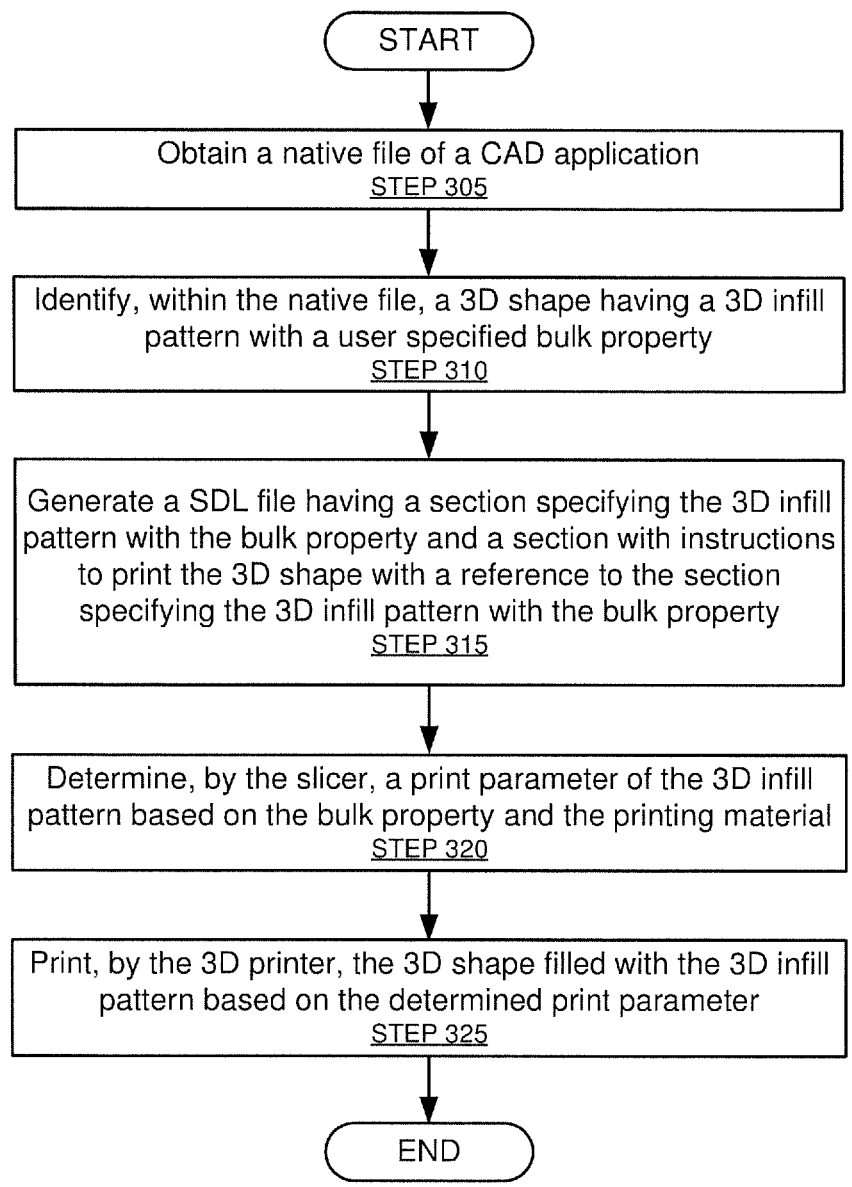

FIG. 3 shows a flowchart in accordance with one or more embodiments of the invention. The flowchart depicts a process for 3D printing. One or more of the steps in FIG. 3 may be performed by the components of the system (100), discussed above in reference to FIG. 1. The process depicted in FIG. 3 may be considered an augmented version of the process depicted in FIG. 2. In other words, some of the steps in FIG. 3 may be merged with steps in FIG. 2 or added to the steps in FIG. 2. In one or more embodiments of the invention, one or more of the steps shown in FIG. 3 may be omitted, repeated, and/or pedal lied in a different order than the order shown in FIG. 3. Accordingly, the scope of the invention should not be considered limited to the specific arrangement of steps shown in FIG. 3.

Initially, a native file for a CAD application is obtained (STEP 305). STEP 305 is essentially the same as STEP 205, discussed above in reference to FIG. 2. However, the native file includes a user-desired bulk property (e.g., density, tensile strength, etc.) of the 3D infill pattern. In STEP 310, a 3D shape having the 3D infill pattern with the user-desired bulk property is identified from (e.g., by parsing) the native file.

In STEP 315, a SDL file is generated. STEP 315 is essentially the same as STEP 215, discussed above in reference to FIG. 2. However, in STEP 315, the section of the SDL file that specifies the 3D infill pattern also specifies the user-desired bulk property. The SDL file may be sent to a slicer of a 3D printer. Additionally or alternatively, the bulk property may be specified in any section of the SDL file.

In STEP 320, the slicer determines one or more print parameters of the 3D infill pattern in order to meet the user-desired bulk property. This determination may be based on the printing material (e.g., rubber, plastic, etc.) being used as well as the printing technology and mechanical components being utilized by the 3D printer. For example, if the 3D infill pattern is a honeycomb, the print parameter may be the size of a cell of the honeycomb or the thickness of a wall of a cell. If the 3D pattern is a 3D checkerboard, the print parameter may be the volume of each cube in the checkerboard.

In STEP 325, the 3D printer prints the 3D shape filled with multiple instances of the 3D infill pattern according to the determined print parameters. As a result, the printed 3D shape filled with multiple instances of the 3D infill pattern has the user-desired bulk property.

Although the process in FIG. 3 explicitly mentions a 3D infill pattern, the process is similar for texture patterns. The SDL file includes the user-specified bulk property for the texture pattern, and the slicer determines one or more print parameters based on the printing material and the hardware of the 3D printer to realize the user-desired bulk property.

Figure 4A:
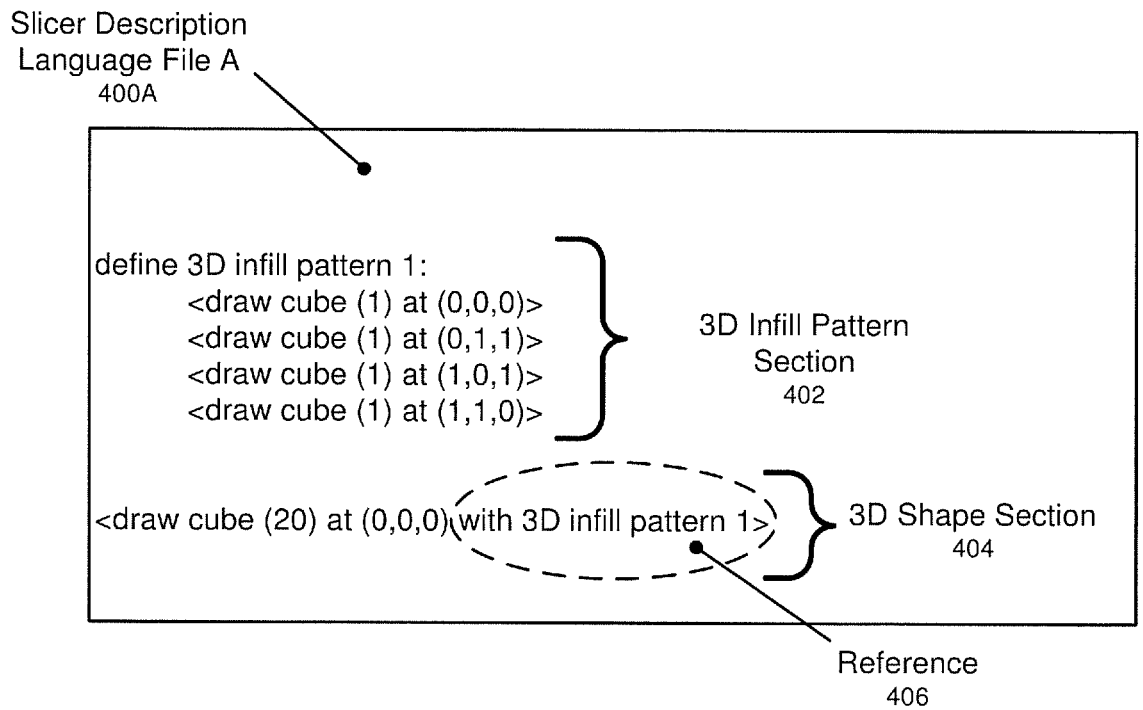
FIG. 4A and FIG. 4B show examples in accordance with one or more embodiments of the invention.
Figure 4B:
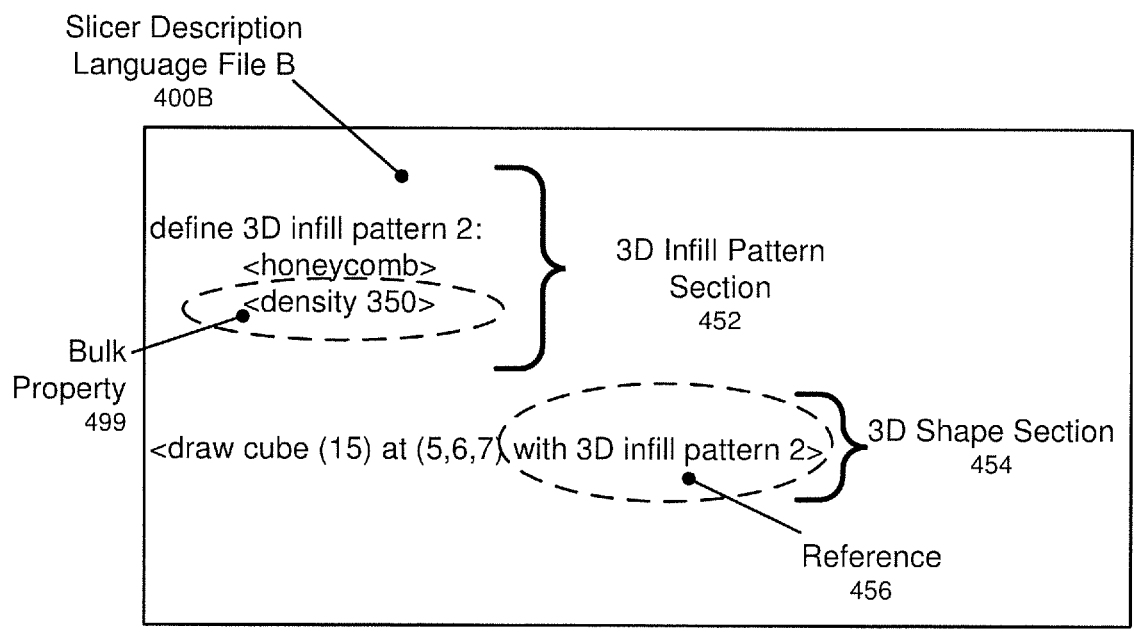

FIG. 4A and 4B show examples in accordance with one or more embodiments of the invention. Specifically, FIG. 4A shows SDL file A (400A) generated by a CAD application (not shown). As shown in FIG. 4A, SDL file A (400A) includes both a 3D infill pattern section (402) and a 3D shape section (404). Assume the command <draw cube (k) at (x, y, z)>prints a cube having dimensions k×k×k at position x, y, z. The 3D infill pattern section (402) includes the commands to print a single geometric unit of 3D infill pattern 1 (i.e., a 3D checkerboard). The 3D shape section (404) includes a command to print a cube having dimensions 20×20×20. The command also includes a reference (406) to the 3D infill pattern section (402). Accordingly, the 3D printer will print the 20×20×20 cube and "fill" it with the 3D checkboard pattern specified in the 3D infill pattern section (402). The 3D printer will need to repeatedly print 3D infill pattern 1 to "fill" the 20×20×20 cube.

FIG. 4B shows SDL file B (400B) also generated by a CAD application.

As shown in FIG. 4B, SDL file B (400B) includes both a 3D infill pattern section (452) and a 3D shape section (454). The 3D infill pattern section (452) specifies 3D infill pattern 2 (i.e., honeycomb). The 3D infill patterns section (452) also specifies a user-desired bulk property (499) of the honeycomb pattern. Specifically, the user-desired bulk property is a density of 350 grams/L. The 3D shape section (454) includes a command to print a cube having dimensions 15×15×15. The command also includes a reference (456) to the 3D infill pattern section (452). The slicer will determine the proper print parameter(s) of a honeycomb pattern in order to achieve the specified average pattern density, given the density of the material being used in the 3D printer. For instance, if the material used in the 3D printer had a density of 700 grams/L, then the slicer would choose pattern parameters to achieve a 50:50 ratio of print material and empty space.

In this case parameters could be varied in a number of ways to achieve that ratio. For instance, it could be achieved by keeping the honeycomb cell size fixed, and varying the cell wall thickness; or keeping the cell wall thickness fixed and varying the size; or a combination of these; or changing other parameters. That determination could be left up to the slicer, or could be specified by the user by means of additional commands in SDL file B (400B).

Various embodiments of the invention may have one or more of the following advantages: the ability to apply 3D infill patterns and/or texture patterns to 3D shapes in a CAD application; the ability to specify a user's high-level intent in an SDL file; the ability to separately specify a 3D infill pattern from a 3D shape in an SDL file; the ability to separately specify a texture pattern from a 3D shape in an SDL file; the ability to specify desired bulk properties of a 3D infill pattern or texture pattern; the ability to reduce the size of an SDL file using references; the ability to avoid slicer specific SDL files; the ability to specify a geometric unit of a 3D infill pattern or texture pattern in an SDL file; etc.

Figure 5:
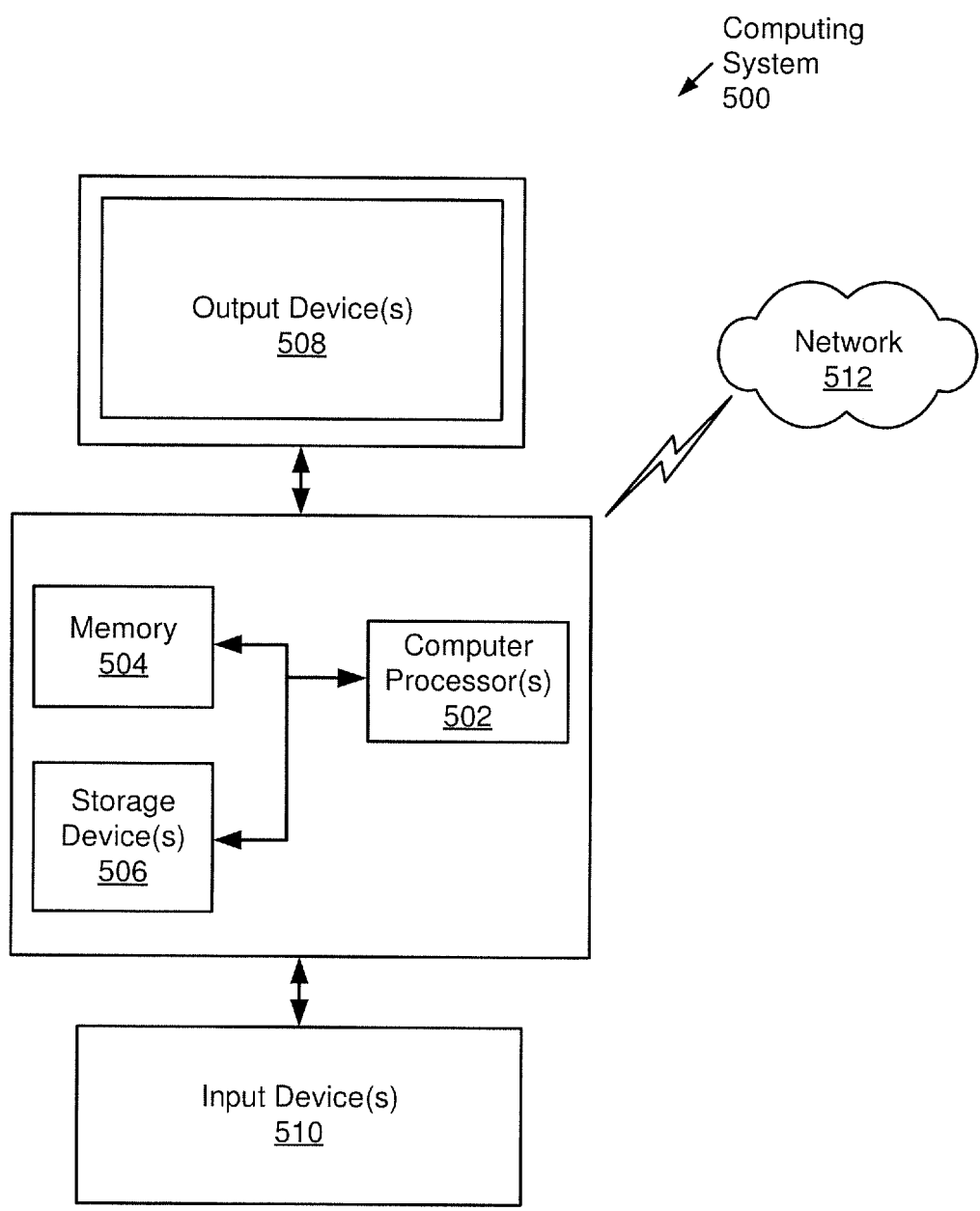
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for three-dimensional (3D) printing, comprising:
    obtaining a native file, of a computer-aided design (CAD) application, that includes a first 3D shape and a 3D infill pattern of the first 3D shape;
    identifying, within the native file, the first 3D shape associated with the 3D infill pattern;
    generating a slicer description language file comprising:
    a first section that includes a single geometric unit of the 3D infill pattern; and
    a second section comprising instructions to print the first 3D shape filled with multiple instances of the 3D infill pattern by referring to only the single geometric unit of the 3D infill pattern in the first section,
    wherein the first section and the second section are separate in the slicer description language file; and
    sending the slicer description language file to a 3D printer for printing the first 3D shape filled with the 3D infill pattern, wherein
    the first 3D shape in the native file is further associated with a texture pattern on a surface of the first 3D shape,
    the slicer description language file further comprises a third section specifying the texture pattern,
    the second section of the slicer description language file further comprises instructions to print the first 3D shape according to the texture pattern by referring to the third section, and
    the 3D printer prints the first 3D shape with the texture pattern on the surface.

2. The method of claim 1, further comprising:
    identifying, within the native file, a second 3D shape associated with the 3D infill pattern,
    wherein the slicer description language file further comprises a third section comprising instructions to print the second 3D shape filled with multiple instances of the 3D infill pattern by referring to only the single geometric unit of the 3D infill pattern in the first section.

3. The method of claim 1, wherein:
    the native file specifies a bulk property of the 3D infill pattern;
    the first section in the slicer description language file further specifies the bulk property of the 3D infill pattern;
    the 3D printer comprises a slicer and utilizes a printing material;
    the slicer determines a print parameter of the 3D infill pattern based on the printing material to satisfy the bulk property; and
    the printed first 3D shape is filled with the 3D infill pattern having the bulk property.

4. The method of claim 3, wherein the bulk property is one selected from a group consisting of tensile strength and density.

5. The method of claim 3, wherein the 3D infill pattern is a honeycomb, and wherein the print parameter is a wall thickness of a cell in the honeycomb.

6. The method of claim 1, wherein the 3D infill pattern is a 3D checkerboard of cubes.

7. A system for three-dimensional (3D) printing, comprising:
    a memory;
    a computer processor that:
        obtains a native file, of a computer-aided design (CAD) application, that includes a first 3D shape and a 3D infill pattern of the first 3D shape;
        identifies, within the native file, the first 3D shape associated with the 3D infill pattern;
        generates a slicer description language file comprising:
            a first section that includes a single geometric unit of the 3D infill pattern; and
            a second section comprising instructions to print the first 3D shape filled with multiple instances of the 3D infill pattern by referring to only the single geometric unit of 3D infill pattern in the first section,
            wherein the first section and the second section are separate in the slicer description language file; and
        sends the slicer description language file; and
    a 3D printer that:
        receives the slicer description language file; and
        prints, based on the slicer description language file, the first 3D shape filled with the 3D infill pattern, wherein
    the first 3D shape in the native file is further associated with a texture pattern on a surface of the first 3D shape
    the slicer description language file further comprises a third section specifying the texture pattern
    the second section of the slicer description language file further comprises instructions to print the first 3D shape according to the texture pattern by referring to the third section, and
    the 3D printer prints the first 3D shape with the texture pattern on the surface.

8. The system of claim 7, wherein the computer processor also:
    identifies, within the native file, a second 3D shape associated with the 3D infill pattern,
    wherein the slicer description language file further comprises a third section comprising instructions to print the second 3D shape filled with multiple instances of the 3D infill pattern by referring to only the single geometric unit of the 3D infill pattern in the first section.

9. The system of claim 7, wherein:
the native file specifies a bulk property of the 3D infill pattern;
the first section in the slicer description language file further specifies the bulk property of the 3D infill pattern;
the 3D printer comprises a slicer and utilizes a printing material;
the slicer determines a print parameter of the 3D infill pattern based on the printing material to satisfy the bulk property; and
the printed first 3D shape is filled with the 3D infill pattern having the bulk property.

10. The system of claim 9, wherein the bulk property is one selected from a group consisting of tensile strength and density.

11. The system of claim 9, wherein the 3D infill pattern is a honeycomb, and wherein the print parameter is a wall thickness of a cell in the honeycomb.

12. The system of claim 7, wherein the 3D infill pattern is a 3D checkerboard of cubes.

13. A non-transitory computer readable medium (CRM) storing computer readable program code executed by a computer processor that:
obtains a native file, of a computer-aided design (CAD) application, that includes a first 3D shape and a 3D infill pattern of the first 3D shape;
identifies, within the native file, the first 3D shape associated with the 3D infill pattern;
generates a slicer description language file comprising:
a first section that includes a single geometric unit of the 3D infill pattern; and
a second section comprising instructions to print the first 3D shape filled with multiple instances of the 3D infill pattern by referring to only the single geometric unit of the 3D infill pattern in the first section,
wherein the first section and the second section are separate in the slicer description language file; and
sends the slicer description language file to a 3D printer for printing the first 3D shape filled with the 3D infill pattern, wherein
the first 3D shape in the native file is further associated with a texture pattern on a surface of the first 3D shape,
the slicer description language file further comprises a third section specifying the texture pattern,
the second section of the slicer description language file further comprises instructions to print the first 3D shape according to the texture pattern by referring to the third section, and
the 3D printer prints the first 3D shape with the texture pattern on the surface.

14. The non-transitory CRM of claim 13, wherein the program code executed by the computer processor also:
identifies, within the native file, a second 3D shape associated with the 3D infill pattern,
wherein the slicer description language file further comprises a third section comprising instructions to print the second 3D shape filled with multiple instances of the 3D infill pattern by referring to only the single geometric unit of the 3D infill pattern in the first section.

15. The non-transitory CRM of claim 13, wherein:
the native file specifies a bulk property of the 3D infill pattern;
the first section in the slicer description language file further specifies the bulk property of the 3D infill pattern;
the 3D printer comprises a slicer and utilizes a printing material;
the slicer determines a print parameter of the 3D infill pattern based on the printing material to satisfy the bulk property; and
the printed first 3D shape is filled with the 3D infill pattern having the bulk property.

16. The non-transitory CRM of claim 15, wherein the bulk property is one selected from a group consisting of tensile strength and density.

17. The non-transitory CRM of claim 15, wherein the 3D infill pattern is a honeycomb, and wherein the print parameter is a wall thickness of a cell in the honeycomb.

* * * * *